United States Patent [19]
Brooker

[11] Patent Number: 5,549,771
[45] Date of Patent: Aug. 27, 1996

[54] FABRICATION OF BODY CONTAINING LENGTHS OF FIBER EMBEDDED THEREIN

[76] Inventor: David A. Brooker, 1007 Howard Ave. #49, Escondido, Calif. 92029

[21] Appl. No.: 372,381

[22] Filed: Dec. 23, 1994

[51] Int. Cl.⁶ .............. B29C 44/12; B29C 70/86
[52] U.S. Cl. .............. 156/153; 156/173; 156/303.1; 264/46.7; 264/162; 264/279
[58] Field of Search .............. 156/78, 79, 153, 156/154, 169, 173, 175, 303.1; 264/46.4, 46.7, 139, 279, 279.1, 162; 52/309.7, 309.9, 309.11; 428/113, 119, 309.9

[56] References Cited

U.S. PATENT DOCUMENTS

| | | | |
|---|---|---|---|
| 2,762,739 | 9/1956 | Weiss | 264/279.1 |
| 3,206,343 | 9/1965 | McFarlane | 156/78 |
| 3,214,321 | 10/1965 | Graham | 264/258 |
| 3,328,218 | 6/1967 | Noyes | 428/119 |
| 3,881,972 | 5/1975 | Long | 156/79 |
| 4,808,461 | 2/1989 | Boyce et al. | 428/119 |
| 5,330,599 | 7/1994 | Aochi et al. | 156/173 |

FOREIGN PATENT DOCUMENTS 9403 4/1980 European Pat. Off. ............ 52/309.11

Primary Examiner—Steven D. Maki

[57] ABSTRACT

A body containing lengths of fiber embedded therein is formed by providing a winding fixture including a plurality of parallel support rods spaced apart in a Z-direction. A length of a fiber is wound over the rods such that a portion of the fiber extends in the Z-direction, to form a skeletal structure. The fiber may be coated, as with a resistive material to modify energy absorbtion, after winding. The skeletal structure is filled with foam, and the support structure is removed to leave a structure in which discrete lengths of fiber embedded in the foam lie parallel to the Z-direction. The fibers may be transferred to a sheet of uncured polymeric material by placing the foam piece in contact with the sheet of polymeric material and forcing the fibers into the sheet under an applied pressure.

19 Claims, 5 Drawing Sheets

FABRICATION OF BODY CONTAINING LENGTHS OF FIBER EMBEDDED THEREIN

BACKGROUND OF THE INVENTION

This invention relates to composite materials, and, more particularly, to forming a composite material having fibers directionally embedded in a foam and structures made therewith.

In a composite material, two or more separate phases are combined together to form a single material. Each of the phases retains its physical identity in the composite material. In one type of composite material, a first phase is embedded into a matrix of a second phase. The first phase may be in the form of fibers lying parallel to an expected direction of high load of the composite material during service, so that the fibers serve to strengthen the composite material. A common configuration of this type of composite material has reinforcing fibers lying in the plane of a sheet of the matrix material. A number of techniques are available to manufacture such composite materials.

In another type of composite material, it is desired that short lengths of fiber be embedded in a sheet of the matrix material, but that the lengths of fiber lie perpendicular to the plane of the sheet. That is, the lengths of fiber lie parallel to the through-thickness direction (also often termed the "Z-direction"). As an example of the dimensions involved, the sheet of composite material may be about 1 inch thick with pieces of the fiber of that length and spaced about 1/8 inch apart. In one application, short lengths of energy-absorbing fibers are oriented in the Z-direction within a sheet of foam or polymeric material. The fibers aid in absorbing incident energy such as radar waves.

The fabrication of a sheet of a composite material with short lengths of fiber embedded perpendicular to the face of the sheet (i.e., lying parallel to the Z-direction) is difficult. In one approach, a three-dimensional weave is formed and impregnated with the matrix material. The shortcoming of this approach is that the arrangement of the fibers is dictated by the available weaving technique and the fibers lying in the plane of the sheet. In another approach, fibers are placed into the sheet essentially one at a time. This approach is tedious and costly. In both techniques, achieving a regular array of fibers may be quite difficult.

There is a need for an improved approach to the fabrication of a composite material having fibers oriented in the through-thickness direction of a sheet. The present invention fulfills this need, and further provides related advantages such as radar absorption.

SUMMARY OF THE INVENTION

The present invention provides a method of fabricating a composite body having lengths of fibers embedded therein. The technique is particularly useful for fabricating a composite sheet in which the lengths of fiber extend perpendicular to the plane of the sheet and are arranged in an orderly array, a configuration which is otherwise quite difficult and costly to fabricate. The approach of the invention is relatively economical to practice, yet produces a regular array of fiber lengths whose arrangement can be controlled over a wide range.

In accordance with the invention, a method for fabricating a body containing lengths of fiber embedded therein comprises the steps of providing a length of a fiber, and providing a winding fixture including a plurality of supports, with at least some of the supports being spaced apart in a Z-direction. The length of fiber is wound over the supports so that at least some of the length of the fiber extends parallel to the Z-direction, to form a skeletal structure. The space within the skeletal structure is filled with a matrix material, and the material is processed to remove the supports and produce a face, preferably two parallel faces, lying perpendicular to the Z-direction.

This technique is preferably practiced using an array of parallel rods, arranged in a rectilinear array, as the supports. The continuous length of fiber is wound over the supports, so that one portion of the fiber lies in the Z-direction and another portion of the fiber lies perpendicular to the Z-direction. The matrix material is preferably a foam, so that the skeletal structure is filled by spraying, casting, or otherwise applying a foam precursor to the structure. The support rods, the portion of the fiber lying perpendicular to the Z-direction, and the corresponding portion of the foam are removed, as by machining. The result is a foam piece such as a sheet with fiber lengths extending perpendicular to the faces of the sheet.

This composite foam with embedded fibers can be used in this as-fabricated form having a foam matrix, or it can be used as an intermediate material in the fabrication of a composite sheet having a polymeric matrix. In the latter case, the fibers are transferred from the foam sheet to an unpolymerized polymer sheet by placing the sheets in facing contact and applying a pressure to the composite foam sheet to force the fibers from the foam into the polymer sheet. The polymer sheet is thereafter cured with the fiber lengths extending perpendicular to the faces of the sheet.

Foam or polymeric sheets having fibers embedded per perpendicular to the sheet faces are particularly useful as face sheets in structural applications where the fibers are present to absorb incident radio frequency energy. The fibers can be selected of materials that absorb microwave or other high-frequency energy and arranged in a pattern and spacing that maximizes such absorption. Such materials are available in the form of long fibers that can be wrapped over the supports in the manner described above, with later removal of the portion that does not lie parallel to the Z-direction.

The present invention provides an advance in the economical production of composite materials with short fibers oriented in the Z-direction. Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIGS. 6(a)–(c) are a series of elevational views of a fiber transferral process for making a composite material, wherein FIG. 6(a) shows a fiber-embedded foam in face-to-face contact with a sheet of uncured polymeric material, FIG. 6(b) illustrates the effect of the application of a pressure, and FIG. 6(c) shows the removal of the depleted foam.

DETAILED DESCRIPTION OF THE INVENTION

Figure 1A:
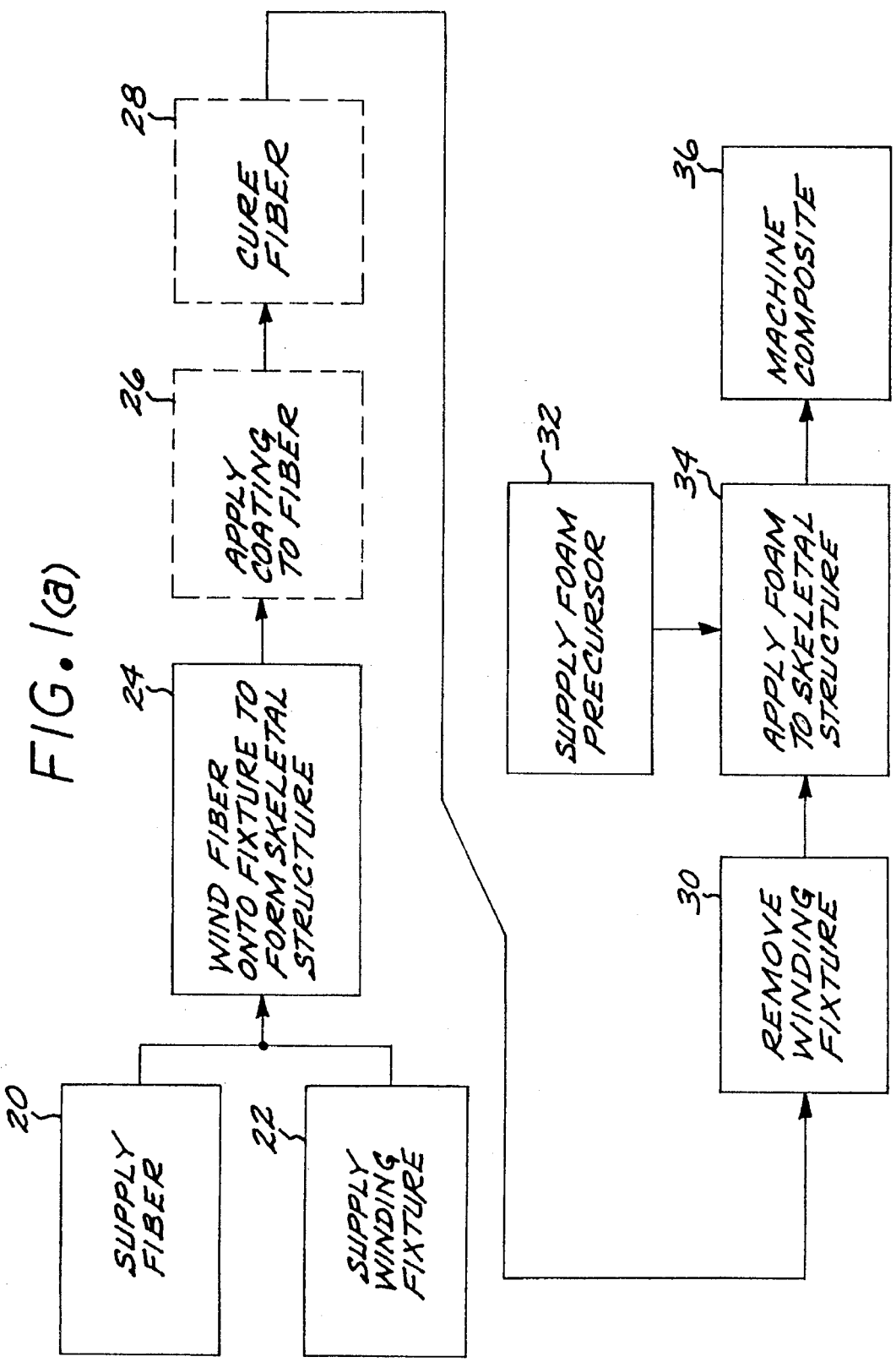
FIG. 1(a) is a block flow diagram illustrating the practice of the invention.
Figure 1B:
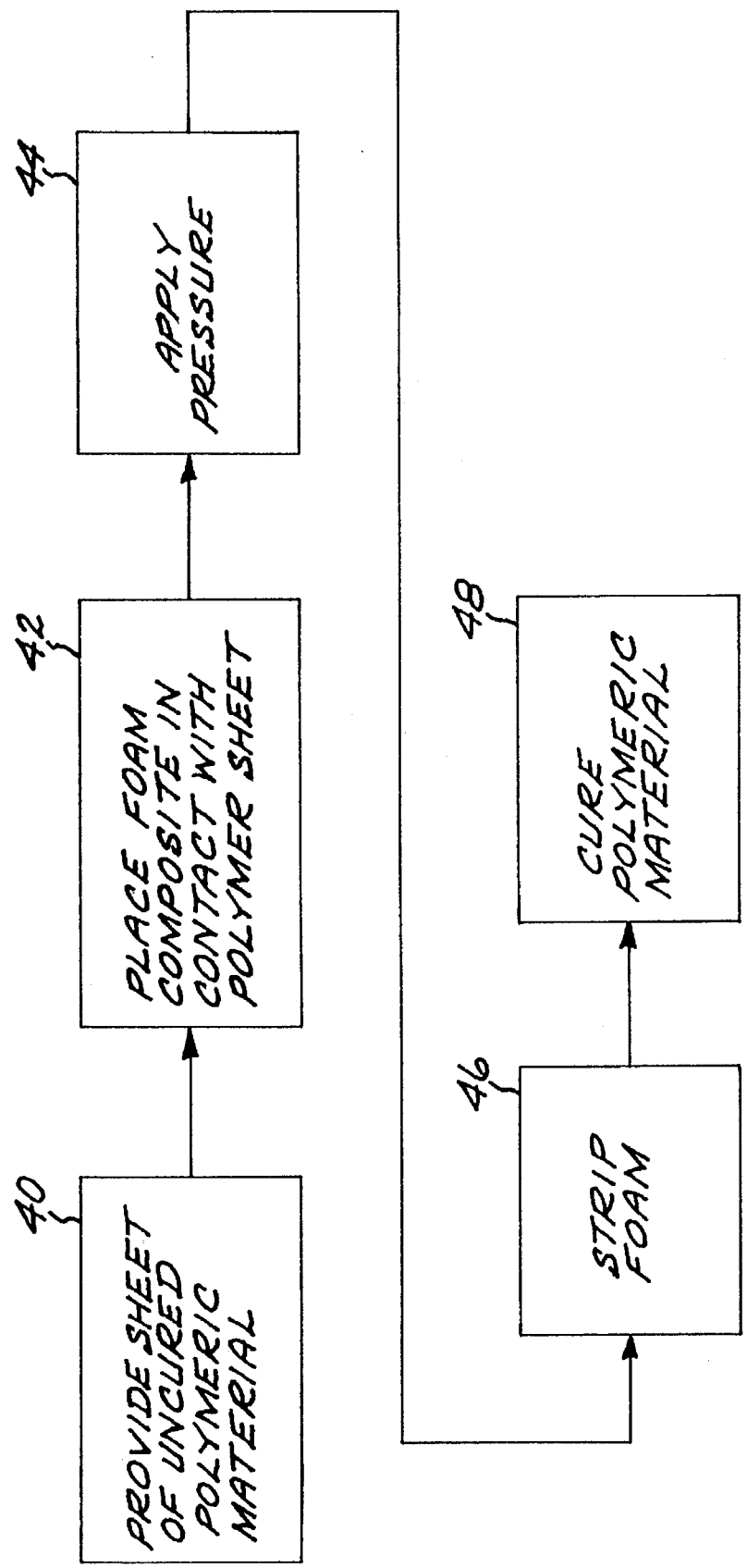
FIG. 1(b) is a block flow diagram illustrating a use of the composite structure resulting from the method of FIG. 1 (a)
Figure 2:
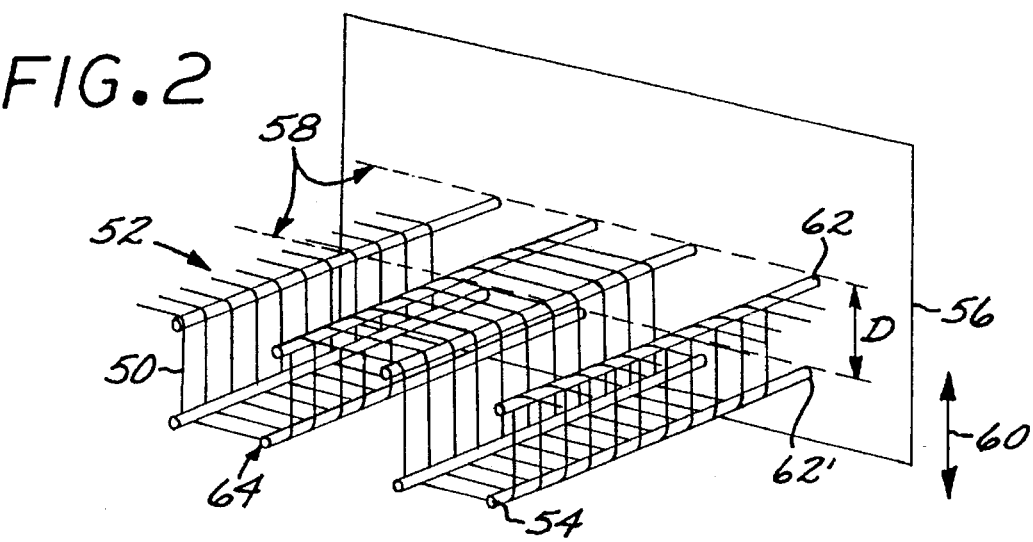
FIG. 2 is a perspective drawing of a skeletal structure.

Referring to FIGS. 1 and 2, a length of a fiber 50 is provided, numeral 20. The fiber is of any type that can be provided in a long, essentially continuous, length. Examples of suitable fiber materials 50 include carbon, quartz, S-2 glass, E-glass, D-glass, Kevlar®, and Spectra® fibers, and the selection of the particular fiber material depends upon the application of interest for the final composite material. The size (diameter) of the fiber material also depends upon the application, and a wide range of fiber diameters can be used with the present invention. The fiber material 50 can be a single strand, or a collection of individual fibers such as a fiber tow. Thus, as used herein, "fiber" includes single fibers, single fibers covered with a curable material such as an epoxy, collections of fibers such as fiber tows, collections of fibers such as fiber tows which have a resin impregnated therein (a "prepreg" fiber tow), and other similar elongated, fiber-like structures.

In the presently preferred application, the final material is used in an energy-absorbing structure. A dielectric fiber material is selected, most preferably quartz of a diameter of about 8 micrometers. The "fiber" is an epoxy-prepreg fiber tow of about 1000 individual quartz fibers, each of which individual fibers has a diameter of about 8 micrometers.

A winding fixture 52 is supplied, numeral 22. The winding fixture 52 preferably includes a plurality of parallel rods 54, which can be themselves be cantilevered from a base 56. In the preferred embodiment, the rods 54 are arranged in two parallel rows 58, indicated in FIG. 2 by dashed lines. The two rows 58 are spaced apart by a distance D along a direction termed the "Z-direction" 60. The spacing D, and the spacing and arrangement of the rods 54 in the direction perpendicular to the Z-direction 60 but lying parallel to the plane of the base 56, can be varied as desired for particular applications.

The fiber 50 is wound onto the winding fixture 52, numeral 24. The winding pattern can be as desired for particular applications. For the preferred application, the final product has fiber segments which in their entirety lie parallel to the Z-direction 60. The rods 54 are therefore arranged in a rectilinear pattern in the winding support such that there is a rod 62 in the uppermost row directly above a corresponding rod 62' in the lowermost row. The fiber 50 is wound onto the rods 62 and 62' and adjacent rods in what becomes a square-wave pattern, when viewed in elevation along the rod axis. In another possible configuration, only a component of the fiber would lie along the Z-direction 60, and in this case the rods 62 and 62' would not be directly in line along the Z-direction 60 but would instead be laterally offset.

In the illustrated preferred approach of FIG. 2, the fiber is wound in a square-wave pattern over the rods 54 in the two rows 58. There is a first square wave lying in one plane perpendicular to the rod axis, another square wave lying in a parallel plane perpendicular to the rod axis, and so on. The spacing of the parallel planes can be varied as desired. In conjunction with the spacing of the rods along the rows 58, the spacing of the planes determines the pattern or array of the portions of the fibers 50 that lie parallel to the Z-direction 60. This array can be varied as desired, and may be selected and controllably arranged to achieve particular results. For example, the shape and spacing of the portions of the fibers lying parallel to the Z-direction may affect the effectiveness of the final product in absorbing radio frequency energy, and the present invention provides the fabricator great flexibility in selecting and establishing these parameters of the final product. This controllability is to be contrasted with the lack of such precise controllability in other possible fabrication approaches such as weaving.

Optionally, as indicated by dashed block 26, one or more coatings may be applied to the fiber 50 wound over the winding fixture 52. The coating(s) can be of any operable type. In a preferred application, where the fiber 50 is a dielectric fiber and the final product is to be used in energy absorbing applications, resistive coating(s) of materials such as carbon, silver, and nickel could be applied to the dielectric fiber. The coating(s) could be applied uniformly or with a gradient in thickness along the Z-direction 60.

The wound (and possibly coated) fiber is optionally cured, as indicated by dashed block 28. Curing is performed if the fiber includes a curable component, as in the case of the epoxy-impregnated fiber tows used in the preferred embodiment. Curing is accomplished by heating the wound structure to a temperature, and for a time, recommended to cure the curable component. As an example, for an epoxy-impregnated fiber tow, curing is accomplished by heating to a temperature of about 180° F. for about 3 hours.

After curing is complete, the winding fixture is typically removed, numeral 30, and replaced with a holding fixture 63. The holding fixture 63 preferably has support rods 54 that support the wound fiber in much the same manner as in the winding fixture 52.

The combination of the winding fixture 52 or holding fixture 63 and the wound fiber 50 is termed the "skeletal structure" 64, because the matrix is applied to it. A matrix material, in the preferred case a foam, is provided in the space within the skeletal structure. The starting material for the matrix, in this case a foam precursor, is provided, numeral 32. By "foam precursor" is meant a material that transforms into a foam, as for example by a self-foaming action, injection of a gas, etc. The foam may be any foaming material that does not react to degrade the fibers. Some examples of such foams include self-rising, blown, or syntactic foams of urethanes, silicones, epoxy, or thermoplastic resins, but other types of foams can be used as well. As an alternative to the use of foams, other matrix materials such as uncured epoxy or urethane resins can be used. In the preferred application, the matrix material is a self-rising urethane foam.

Figure 3:
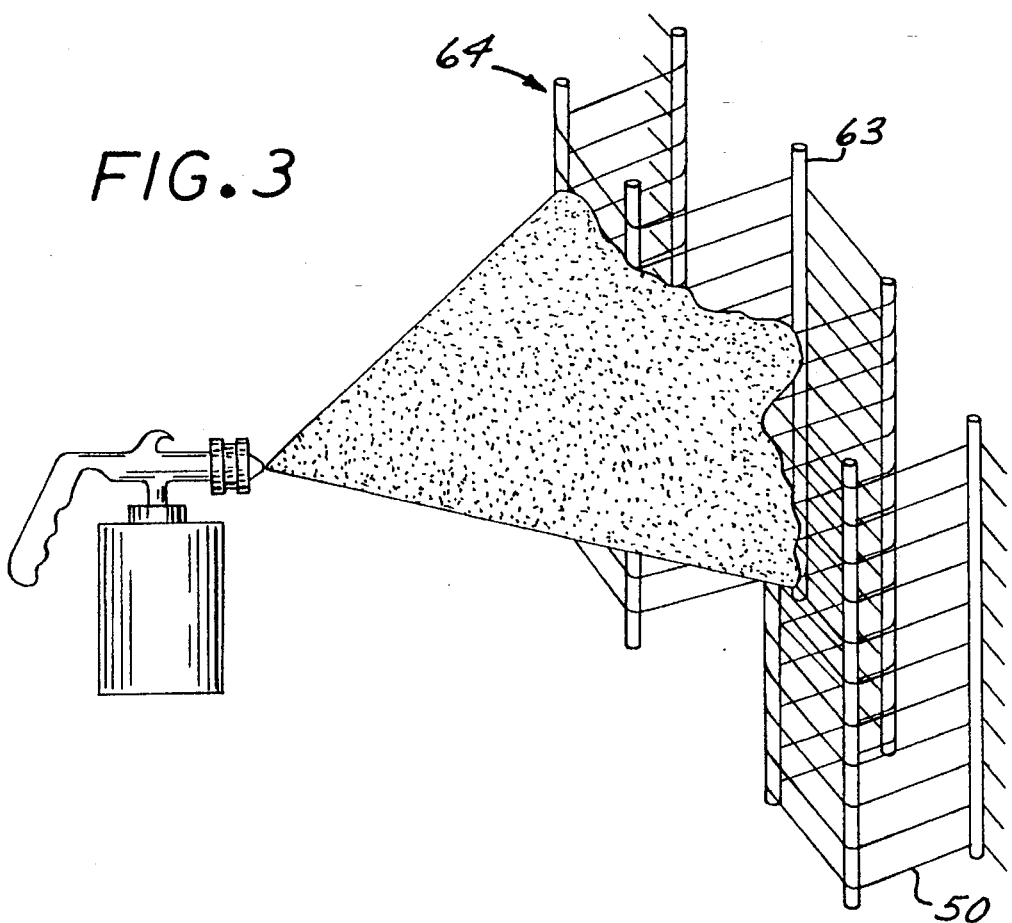
FIG. 3 schematic drawing of the application of a foam to the skeletal structure.

The foam precursor is applied to the skeletal structure 64 by any operable technique, numeral 34. As depicted schematically in FIG. 3, the foam precursor may be applied by spraying. The skeletal structure may first be placed into a mold, not shown, and then the foam precursor applied. If recommended for the particular foam material selected, the foam may be cured after application.

Figure 4:
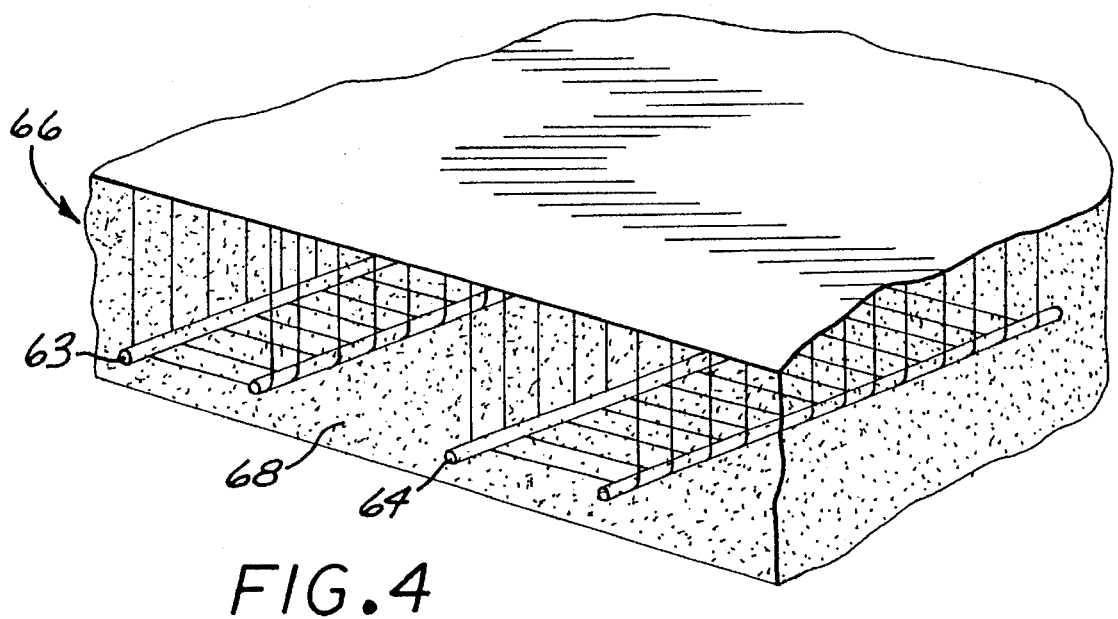
FIG. 4 is a perspective drawing of the skeletal structure (in phantom view) embedded within the foam matrix.

FIG. 4 depicts a partially completed composite material 66, having the skeletal structure 64 embedded in a mass of the hardened foam that serves as a matrix 68.

Figure 5:
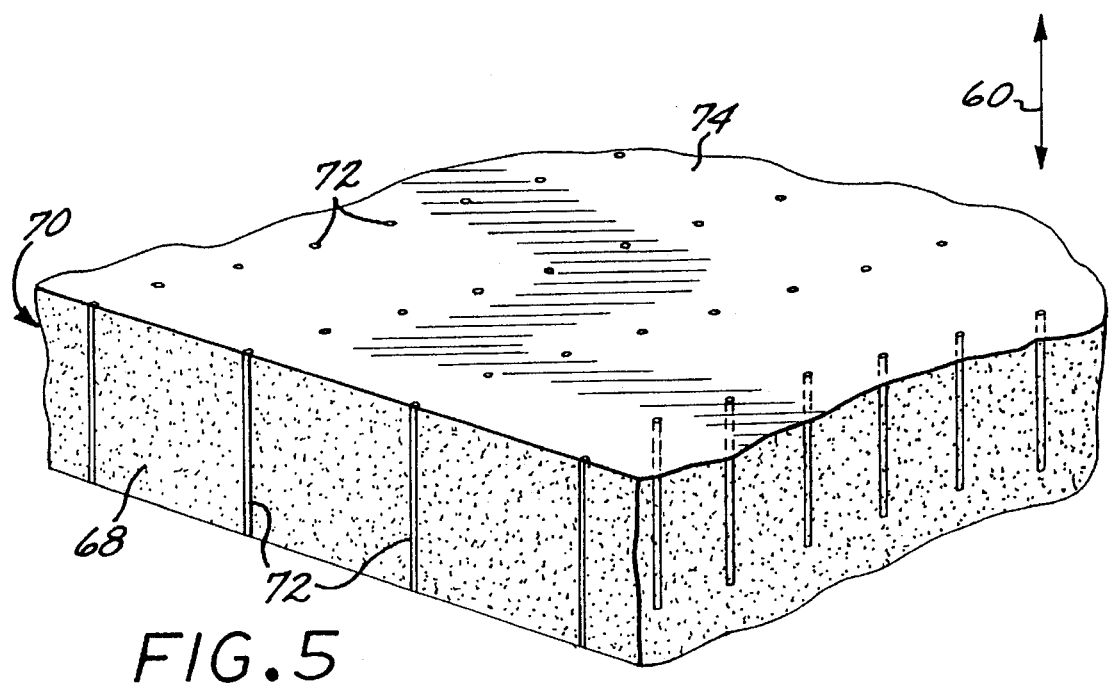
FIG. 5 is a perspective view like that of FIG. 4, except after the structure has been machined.
Figure 6A:
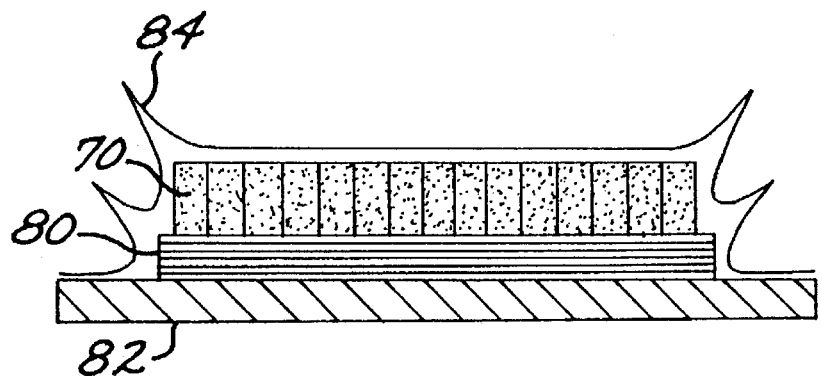
Figure 6B:
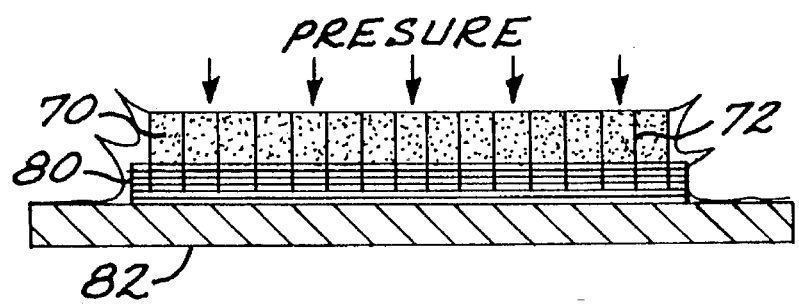
Figure 6C:
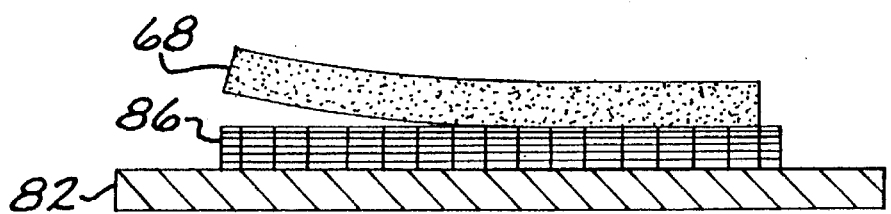

The winding fixture 52 or holding fixture 63 (collectively termed the support), that portion of the wound fiber that does not extend parallel to the Z-direction 60, and the associated excess matrix material are machined away, numeral 36. The removal is typically accomplished by surface machining such as milling, or by cutting. One face 74, and preferably two parallel faces 74, are formed perpendicular to the Z-direction. The resulting foam composite structure 70, shown in FIG. 5, has fiber segments 72 extending parallel to the Z-direction 60 and perpendicular to the faces 74 of the composite structure 70, embedded in the foam matrix 68. FIG. 6 shows a regular rectangular repeating pattern of the ends of the fiber segments 72 on the face 74, but other arrays are possible as desired using the approach discussed previously.

The composite material 70 can be used as a finished product for numerous applications. In one use, the composite material 70, combined with a face sheet, overlies a structural support in a flight vehicle.

The composite material can also be used as an intermediate component in the manufacture of a resin-matrix composite material during which fiber segments are transferred from the foam to a polymer matrix, as depicted in the process block diagram of FIG. 1(*b*). A sheet 80 of an uncured polymeric material is provided, numeral 40. The polymeric material may be an epoxy or other type of curable polymer. The polymeric sheet 80 may be monolithic, or it may have another phase embedded in it. That is, the polymeric sheet 80 could have a reinforcement phase already embedded in it, so that the polymeric sheet would be termed a prepreg in the art. The sheet of composite material 70 and the sheet of uncured polymer 80 are placed in a face-to-face relation, numeral 42, as shown in FIG. 6(*a*). A flat tool 82 is placed on the side of the sheet 80 that does not contact the sheet of composite material 70, and a pressure or vacuum bag 84 is placed on the side of the sheet of composite material 70 that does not contact the sheet 80.

A pressure is applied to the sheet of composite material 70 through the pressure or vacuum bag 84, numeral 44. The pressure forces fiber segments 72 to translate along their fiber axis from the foam matrix into the sheet of uncured polymeric material 80. FIG. 6(*b*) illustrates this structure during the movement of the fiber segments 72 from the foam into the polymeric material.

The foam matrix, typically containing a few residual fiber segments, is stripped away, numeral 46. FIG. 6(*c*) illustrates the stripping of the matrix material. The removal leaves a sheet 86 of polymeric material with embedded fiber segments 72.

The sheet 86 is cured to harden the polymeric material, numeral 48, according to a heating sequence appropriate for the polymeric material. The curing step 40 could b e combined in whole or in part with the pressurization step 36, particularly if the pressurization step is conducted at an elevated temperature.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for fabricating a sheet containing lengths of fiber embedded therein, comprising the steps of:

providing a length of a fiber, providing a winding fixture including a plurality of supports, at least some of the supports being spaced apart in a Z-direction;

winding the length of fiber over the supports to form a three-dimensional skeletal structure comprising at least two parallel two-dimensional layers, each layer having a first portion of the length of the fiber lying parallel to the Z-direction and a second portion of the length of the fiber lying perpendicular to the Z-direction;

filling the space within the skeletal structure with a matrix material; and processing the skeletal structure filled with the matrix material to remove the supports, remove the second portion of the length of the fiber, and produce a composite sheet having a face lying perpendicular to the Z-direction with lengths of the fiber extending in the thickness direction of the composite sheet and lying parallel to the Z-direction.

2. The method of claim 1, wherein the step of providing a length of a fiber includes the step of providing a fiber selected from the group consisting of carbon, quartz, S-2 glass, E-glass, and D-glass fibers.

3. The method of claim 1, wherein the step of providing a winding fixture includes the step of providing a plurality of parallel rods.

4. The method of claim 1, wherein the step of providing a length of a fiber includes the step of providing a fiber having a curable component, and wherein the method includes an additional step, after the step of winding and before the step of filling, of curing the curable component of the fiber.

5. The method of claim 1, including an additional step, after the step of winding and before the step of filling, of applying a coating to the length of fiber.

6. The method of claim 5, wherein the step of applying includes the step of applying a resistive coating.

7. The method of claim 1, wherein the step of filling the space includes the step of providing a foam selected from the group consisting of urethanes, silicones, epoxy, and thermoplastic resins.

8. The method of claim 1, wherein the step of filling the space includes the step of placing the skeletal structure into a mold, and injecting a liquid precursor of a foam into the mold.

9. The method of claim 1, wherein the step of processing comprises the step of machining away the supports, that portion of the reinforcing fiber which does not lie parallel to the Z-direction, and a portion of the matrix material adjacent to the supports.

10. The method of claim 1, wherein the step of processing includes the step of producing two parallel faces perpendicular to the Z-direction.

11. The method of claim 1, including the additional steps, after the step of processing, of providing a sheet of an uncured polymeric material, placing the composite sheet containing lengths of the fiber embedded therein in contact with the sheet of the uncured polymeric material, and applying a pressure to the composite sheet to force the lengths of fiber from the composite sheet into the sheet of the uncured polymeric material.

12. A method for fabricating a sheet containing lengths of fiber embedded therein, comprising the steps of:

providing a length of a fiber, providing a winding fixture including a plurality of parallel rod supports, the parallel support rods being arranged into a first group and a second group that are spaced apart in a Z-direction;

winding the length of fiber over the support rods of the first group and the second group so that first portions of the length of the fiber extend parallel to the Z-direction and a second portion of the length of the fiber extends perpendicular to the Z-direction, to form a skeletal structure;

filling the space within the skeletal structure with a foam; and removing the support rods, the second portion of the fiber, and a portion of the foam lying adjacent to the support rods, to produce a foamed sheet containing lengths of the fiber embedded therein and having at least one face perpendicular to the Z-direction, wherein the lengths of the fiber extend in the thickness direction of the sheet.

13. The method of claim 12, wherein the step of providing a length of a fiber includes the step of providing a fiber selected from the group consisting of carbon, quartz, S-2 glass, E-glass, and D-glass fibers.

14. The method of claim 12, wherein the step of providing a winding fixture includes the step of providing a plurality of parallel rods arranged in a rectilinear array.

15. The method of claim 12, wherein the step of filling the space includes the step of providing a foam selected from the group consisting of urethanes, silicones, epoxy, and thermoplastic resins.

16. The method of claim 12, wherein the step of filling the space includes the step of placing the skeletal structure into a mold, and injecting a liquid precursor of a foam into the mold.

17. A method for fabricating a body containing lengths of fiber embedded therein, comprising the steps of:

providing a length of a fiber;

providing a winding fixture including a plurality of parallel rod supports, the parallel support rods being arranged into a first group and a second group that are spaced apart in a Z-direction;

winding the length of fiber over the support rods of the first group and the second group so that first portions of the length of the fiber extend parallel to the Z-direction and a second portion of the length of the fiber extends perpendicular to the Z-direction, to form a skeletal structure;

filling the space within the skeletal structure with a foam;

removing the support rods, the second portion of the fiber, and a portion of the foam lying adjacent to the support rods, to produce a foamed body containing lengths of the fiber embedded therein and having at least one face perpendicular to the Z-direction;

providing a sheet of an uncured polymeric material;

placing the foamed body containing lengths of the fiber embedded therein in contact with the sheet of the uncured polymeric material; and applying a pressure to the foamed body to force the lengths of the fiber from the foamed body into the sheet of the uncured polymeric material.

18. The method of claim 17, wherein the step of providing a sheet includes the step of providing a sheet of an uncured polymeric material containing a reinforcement embedded therein.

19. The method of claim 17, including the additional steps, after the step of applying, a pressure of removing the foamed body from which the lengths of fiber have been removed, and curing the sheet of uncured polymeric material into which the lengths of fiber were forced in the step of applying.

* * * * *